United States Patent [19]
Kekich

[11] Patent Number: 4,648,611
[45] Date of Patent: Mar. 10, 1987

[54] FOLDABLE SLED OR TOBOGGAN

[76] Inventor: Ivica J. Kekich, 1827 Parkhurst Ave., London, Ontario, Canada, N5V 2C4

[21] Appl. No.: 739,179

[22] Filed: May 30, 1985

[51] Int. Cl.⁴ .............................................. B62B 13/16
[52] U.S. Cl. ..................................... 280/20; 403/391; 403/399
[58] Field of Search ................... 280/20, 15, 649, 642; 403/391, 396, 399, 400

[56] References Cited

U.S. PATENT DOCUMENTS

| | | | |
|---|---|---|---|
| 2,395,208 | 2/1946 | Wylie | 280/642 |
| 3,365,209 | 1/1968 | Fischer | 280/20 |
| 4,245,850 | 1/1981 | Boudreau | 280/649 |

FOREIGN PATENT DOCUMENTS 2115358 9/1983 United Kingdom .................. 280/20

Primary Examiner—John J. Love
Assistant Examiner—Eric D. Culbreth
Attorney, Agent, or Firm—Mitches & Co.

[57] ABSTRACT

A foldable sled is composed of essentially four operative components, two symmetrically closed loop members having two opposite sides extended and being relatively parallel to each other, each of the loops configured to lie in their own respective plane, pivot pins for pivoting the symmetrical loops to be relatively positioned so that the straight portions of each loop may be positioned relatively close or relatively far away, a fabric seat extending between two adjacent straight pieces of opposite closed loops, and a clasp for locking and constraining the closed loops into an open and a closed position, whereby in the open position, the sled is in its operative condition and in the closed, it is in a condition for convenient carriage or stowage.

4 Claims, 7 Drawing Figures

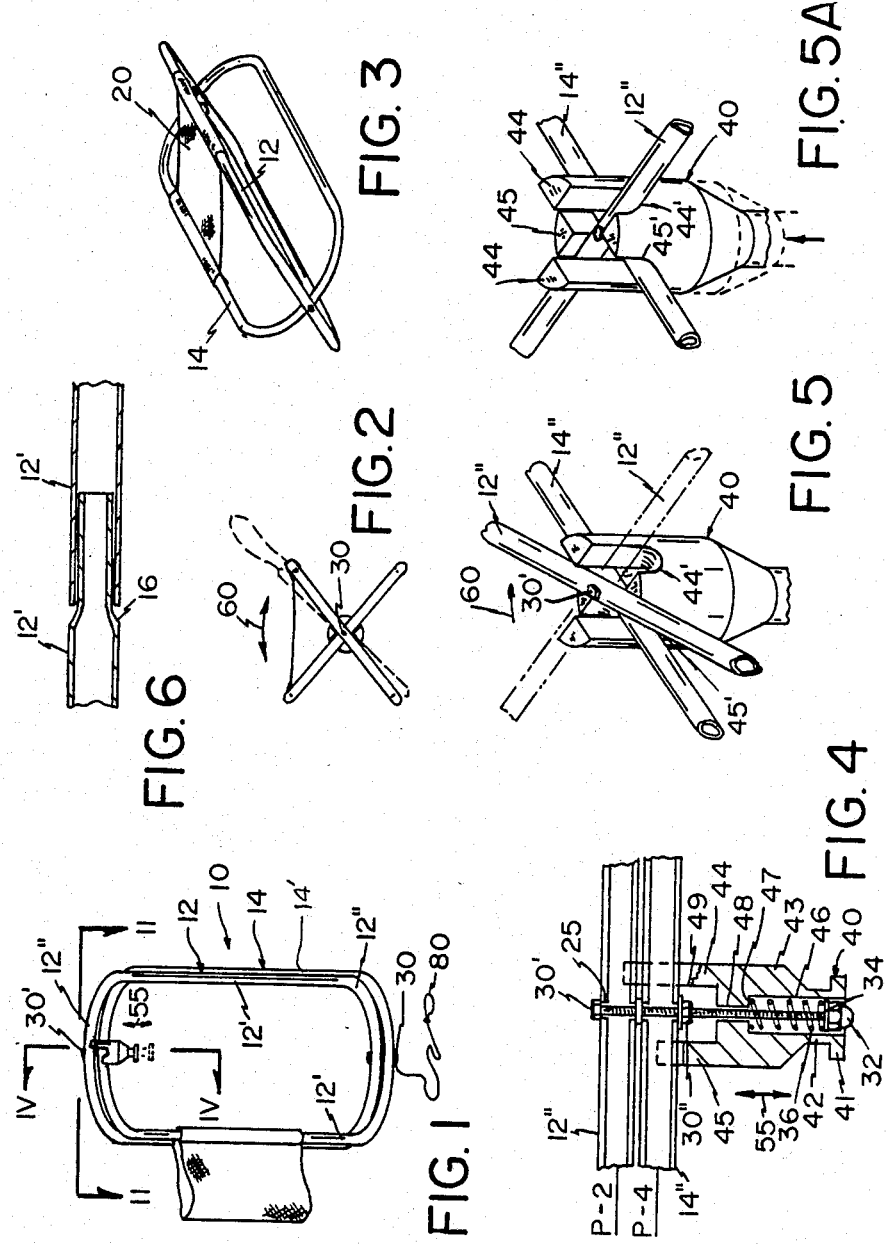

FOLDABLE SLED OR TOBOGGAN

The invention relates to a sled or toboggan; particularly to a sled, light in weight, that conveniently folds.

The words sled, sleigh, shall be used interchangeably with toboggan herein and as will be appreciated hereafter, the invention relates to common features of each of these vehicles.

An object of the invention is to provide a foldable sled of lightweight rigid construction, that is safe to use and easily transformed from its folded state, to its unfolded, open and operative state, quickly, easily, yet locks the sled in its open state and its closed state. Locking the sled in the open state prevents unexpected folding, particularly in use, that could otherwise result in injury to a rider, while locking in its closed state ensures easy handling during carriage or stowage. Other objects will be apparent.

The invention achieves therefore a foldable sleigh comprising;

(a) two identical closed loop members, each fashioned into a generally elongated loop wherein two of the opposite sides are longer than the other two opposite sides and the longer sides are essentially parallel to each other, while the shorter sides are respectively similarly curvilinear, each of the shorter sides defining essentially mid-point therealong a pivot point;

(b) a first and a second pivot means, each pivot means connected to a pivot point of each of the said loops whereby to hold the two loops in adjacent yet cascading relationship; and, (c) a moving clasp, carried by one of the pivot means, and adapted to slidingly extend into each of a first and a second plane, a first plane defined by one set of curvilinear shorter sides of one of the loops, the second plane defined by the curvilinear shorter side of the other adjacent loop, whereby the clasp, when extending through both said planes constrains the two closed loops, on the one hand at approximately 90°, and on the one hand, at approximately 12° or less.

The invention further contemplates a foldable sled comprising;

(a) two identical closed loop members, each fashioned into a generally elongated loop wherein two of the opposite sides are longer than the other two opposite sides and the longer sides are essentially parallel to each other, while the shorter sides are respectively similarly curvilinear, each of the shorter sides defining essentially mid-point therealong a pivot point;

(b) means including a first and second pivot means disposed to pivot each of the said loops at a central point in each of the two opposite shorter sides; and, (c) means for holding the said loops in a respectively open and respectively closed predetermined angular position.

The invention will now be described by way of example and reference to the accompanying drawings in which;

FIG. 1 is a plan view of the invention with sled in the folded condition.

FIG. 2 is an end view being a view along lines II—II of FIG. 1 of the sled but in its open condition; shown in phantom it is folded.

FIG. 3 is a perspective of the sled of FIG. 1 in its open and operative condition, ready for sliding.

FIG. 4 is a section along IV—IV of FIG. 1 being a section through a pivot with sliding clasp whereby locking of the sled in its open and closed position is achieved.

FIGS. 5 and 5A are perspective views of the sliding clasp of FIG. 5.

FIG. 6 is a section through the mating ends of each endless loop.

Referring to FIG. 1, the sled is generally indicated as 10 and consists of two closed loop members 12 and 14, each loop essentially elongated along two of its larger sides so that these longer sides 12', 14' are essentially parallel to each other, while the shorter sides or ends are curvilinear as at 12" and 14" respectively. Each of the two loops 12 and 14 are identical and symmetrical. As such, the same die and forming mechanism may be used to create both of the closed loops 12 and 14. Preferably, the closed loops are fabricated of extruded hollow steel being approximately 1 inch in outside diameter and about 48/1000 of an inch walls thickness. The loops are "flat" loops, that is all members of the loop are coincident to the same plane.

In reality, and referring to FIG. 6, each of the loop members is composed of a length of hollow material appropriately bent, with one end swaged as at 16 into an outside diameter slightly smaller than the inside diameter of the tubing and then press fitted to mate in a manner as those skilled in the art will know, whereby the endless loop is formed. Over this swaged interface a fabric seat 20 extends between each of the loops 14 and 16 as more clearly seen in FIGS. 2 and 3. The fabric 20 may be provided, along its lateral margins, with a loop sewn into the material through which a straight side of each of the loop members 12, 14 extend prior to the mating of the swaged end 16 into the open end of each loop. On mating of the ends the seat is formed. Alternatively, the fabric seat 20 may be affixed by any other convenient means. The sleigh is completed by attaching a towing rope 80, only shown in FIG. 1, to one end so that it may be pulled along the ground.

Each of the curvilinear short ends 12' and 12", 14' and 14" have centrally located therealong, an aperture 25 through which a pivot pin, a bolt 30, extends. The pivot pin bolt 30 has a nut at its opposite end threaded thereon and secured thereto so as not to work itself loose. One of the bolts 30' is longer than the other and extends through a coaxially sliding, spring loaded, retaining clamp 40 that slides to and fro arrow 55 along the longer pivot pin 30'. The clamp 40 is shaped as a modified cylindrical housing and is of a rigid molded plastic or like material. The cylindrical housing has a distal end that is flanged into a collar 41 that acts as a gripping surface. The collar 41 extends through a cylindrical straight piece 42 into a tapered main body portion 43, while the body portion extends into its proximate end as a pair of major fingers 44 and a pair of minor fingers 45. Both pairs of fingers are diametrically opposed one to the other, as clearly seen in FIG. 5, and interjoined by major and minor cusps 44' and 45'. The fingers and cusps trace out an annulus being the locii of the points defined by the prolongation of the cylindrical body portion 43. Hence, they collectively trace and define a second major bore 49. The body portion from proximate to distal ends define a central core with a first major bore 43 communicating with the distal end through the collar 41 stepping at step 47 into a minor bore 48 and thereafter into a second major bore which is defined in part by the fingers 44 and 45. The three bores therefore are coaxial along the axis of revolution of the cylindrical housing.

In the first major bore 46, a coiled spring 36 nests against the step 47 on the one end, and against a washer 34 underlaying the terminating nut 32 threaded onto the shaft of the longer bolt 30' as shown. Turning down the nut 32 on the bolt 30 increases the bias of the spring 36 and urges the fingers 44 and 45, as will be more clearly understood hereafter, into the planes P-2 and P-4 respectively.

Referring to FIGS. 4 and 5, both major and minor fingers 44 and 45 extend into the planes of the curvilinear short ends 12" and 14", respectively indicated in FIG. 4 as plane P-2 and plane P-4. Specifically, the major finger 44 extends through plane P-4 into plane P-2 as shown in phantom in FIG. 4. The minor finger 45 extends into plane P-4 being the longitudinal axis of the inner curvilinear member 14" at right angles to the pivot orifice 25 thereof. Major and minor cusps, 44' and 45', and referring to FIG. 5 accommodate, on the one hand, the inner curvilinear member 12" into the major cusps 44', when, as seen in FIG. 5A, and also in FIGS. 2 and 3, the sled is in its open and operable position ready for sliding. In that condition the other inner curvilinear member 14" rests in the minor cusps 45' as seen in FIG. 5A. When the sled is closed, as shown in phantom in FIG. 2 and in FIG. 1, that inner curvilinear member 12', and now referring to FIG. 5, moves from the phantom position in response to arrow 60 depicting the closing movement of the sled, to the solid position as shown and eventually essentially overlays, in a manner as shown in FIG. 2, the inner curvilinear member 14" whereupon to "seat" or nest into the prolongation of the minor cusp 45' (not clearly shown in FIG. 1 or 2 but seen in FIGS. 5 and 5A).

In operation the distal end collar 41 acts as a gripping surface so that the cylinder clamp 40 may be pulled away from planes P-2 and P-4 according to arrow 55 in FIG. 4 and to remove from intersection with planes P-2 and P-4, respectively, the major finger 44 and the minor finger 45. The relative angular positions therefore of the two endless loops 12 and 14 may be changed, for instance, and referring to FIG. 2, from the solid position thereof to the phantom closed position, arrow 60 and thereupon the collar 41 releases so that the biasing spring 46 urges the fingers into planes P such that the minor fingers 45 intersect plane P-4 and the major fingers 44 intersect plan P-2. In fact the angle subtended by the sectors of each finger is such that the sectoral margins thereof urge against opposite curvilinear pieces 12" and 14" and "hold" the sled into the opened or into the closed position as the case might be. In this way, the sled is "locked" into the opened or into the closed position.

Those skilled in the art will appreciate that the invention may have significant modifications hereto without departing from the spirit as claimed.

The embodiments of the invention in which an exclusive property or privilege is claimed are defined as follows:

1. A foldable sleigh comprising;
   (a) two identical closed loop members, each fashioned from a single length of material into a generally elongated loop wherein two of the opposite sides are longer than the other two opposite sides and the longer sides are essentially parallel to each other, while the shorter sides are respectively similarly curvilinear, each of the shorter sides defining essentially as a mid-point therealong, a pivot point;
   (b) one loop member lying in a first plane, the other in a second plane;
   (c) a first and a second pivot means, each pivot means connected to a pivot point in one of each of the said loop members whereby to hold the two loop members in adjacent yet cascading relationship;
   (d) a moving clasp including major and minor pairs of fingers, the fingers of each pair opposite each other and each said minor finger disposed between each said major finger, each said minor finger spaced from its adjacent major finger on each side by a slot complementary to the cross sectional shape of said loop members, the clasp carried for linear movement along the pivot axis by one of the pivot means, said minor fingers being shorter along the pivot axis than the major fingers and adapted to slidingly extend past a portion of an adjacent curvilinear side of both loop members to selectively constrain the loop members in said slots in their planes that on the one hand are oriented at approximately 90°, and on the other hand at approximately 12°; and,
   (e) means for biasing the moving clasp so that the major and minor fingers index into intersection with, on the one hand, one of said adjacent curvilinear sides, and on the other hand, with both of said curvilinear sides, while allowing said fingers to be removed from said indexing and against the biasing means.

2. The sleigh as claimed in claim 1, including means for biasing the clamp into said first and second planes.

3. The sled as claimed in claim 1, including a flexible sheet fixedly attached to adjacent parallel sides of opposite loops.

4. The sled as claimed in claim 2, including a flexible sheet fixedly attached to adjacent parallel sides of opposite loops.

* * * * *